United States Patent [19]
Emoto et al.

[11] Patent Number: 5,792,568
[45] Date of Patent: Aug. 11, 1998

[54] ORGANIC ELECTROLUMINESCENT ELEMENT

[75] Inventors: Kazuhiro Emoto, Kyoto; Ichiro Fujii, Nara, both of Japan

[73] Assignee: Sharp Kabushiki Kaisha, Japan

[21] Appl. No.: 636,949

[22] Filed: Apr. 24, 1996

[30] Foreign Application Priority Data

Apr. 25, 1995 [JP] Japan .................... 7-101435
May 10, 1995 [JP] Japan .................... 7-111944

[51] Int. Cl.$^6$ ................................ H05B 33/14
[52] U.S. Cl. .................. 428/690; 428/691; 428/917
[58] Field of Search .................. 428/690, 691, 428/917

[56] References Cited

U.S. PATENT DOCUMENTS

| | | | |
|---|---|---|---|
| 5,281,489 | 1/1994 | Mori | 428/690 |
| 5,389,479 | 2/1995 | Morimoto | 430/59 |
| 5,554,450 | 9/1996 | Shi | 428/690 |

FOREIGN PATENT DOCUMENTS 59-194393  1/1984  Japan.

OTHER PUBLICATIONS

Tang & Van Syke, "Organic Electroluminescent Diodes," Appl. Phys. Lett. 51 (12), pp. 913–915 (21 Sep. 1987).
Nippon Gakujutu Shinkokai, Photoelectric Mutual Convention Committee No. 125, 11th El. Subcommittee materials, pp. 19–24 (29 May 1994).
The 39th Joint Lecture Meeting related to Applied Physics, 28p–Q–9.

*Primary Examiner*—Paul R. Michl
*Attorney, Agent, or Firm*—Nixon & Vanderhye

[57] ABSTRACT

An organic electroluminescent element comprising a substrate are stacked layers thereon of, a positive electrode, a holeinjected carrier layer, a luminescent layer and a negative electrode and optionally an electron-injected carrier layer formed between the luminescent layer and the negative electrode, wherein the hole-injected carrier layer comprising a bis-enamine compound represented by the following formula (I):

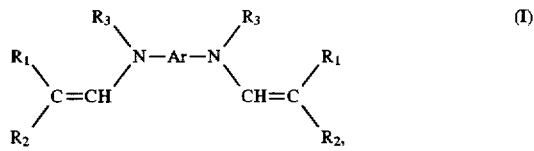

wherein $R_1$ and $R_2$ are, the same or different, a lower alkyl group or an optionally substituted aryl or heterocyclic group, or alternatively, $R_1$ and $R_2$ together with the carbon atom to which they are bonded may form a benzocycloalkyl group, the benzene ring being optionally substituted by a substituent or substituents selected from the group consisting of a halogen atom, a lower alkyl group and a lower alkoxy group; $R_3$ is an optionally substituted aryl or heterocyclic group; and Ar is a methylene group, a vinylene group or an optionally substituted $C_{6-20}$ arylene or heterocyclediyl group.

16 Claims, 1 Drawing Sheet

ORGANIC ELECTROLUMINESCENT ELEMENT

BACKGROUND OF THE INVENTION

1. Field of the Invention

The present invention relates to an organic electroluminescent element and, more particularly, to an organic electroluminescent element for use as a light source, a display or the like.

2. Description of the Related Arts

Conventionally, inorganic electroluminescent elements having a luminescent layer of a material such as ZnS:Mn or SrS:Ce have been developed for practical use. These inorganic electroluminescent elements, however, have problems that they need a high driving voltage of 200 V and that a blue luminescent layer providing practicably high brightness has not been obtained.

In order to solve these problems, various researches have been made, among which an electroluminescent element employing an organic material is attracting attention today. Especially, an organic electroluminescent element with a two-layer structure comprising a hole-injected carrier layer and a luminescent layer is advantageous because of its low driving voltage. By using this, it is possible to obtain a highly bright blue, green or red luminescence. For example, Appl. Phys. Lett. 51(12), pp. 913–915 (1987) discloses an organic electroluminescent element with a two-layer structure comprising a luminescent layer of quinolyl aluminum complex (hereinafter referred to as "Alq3") which is a green fluorescent substance and a hole-injected carrier layer of an aromatic diamine compound which is used in a electrophotographic photoconductor. This element can achieve a green luminescence of about 1000 cd/m2 by applying a direct current of less than 10 V.

However, such organic electroluminescent element generally shows a short life and lacks a reliability. This is assumed due to the unstableness of N,N'-bis(3-methylphenyl)-N, N'-bis(phenyl)-(1,1'-biphenyl)-4,4'-diamine (hereinafter referred to as TPD) which is an aromatic diamine compound used as a major component in a hole-injected carrier layer. For example, in "Nippon Gakujutu Shinkokai, Photoelectric Mutual Conversion Committee No. 125, 11th. EL Subcommittee materials (28th May 1994), page 19–24", TPD is transformed by crystallization from the surface layer from immediately after the vacuum vapor deposition and, when TPD is used in a hole-injected carrier layer of the element, the TPD film becomes unstable by generation of heat from luminescence, thereby lowering the luminescence efficiency.

SUMMARY OF THE INVENTION

The present invention provides an organic electroluminescent element comprising a substrate are stacked layers thereon of, a positive electrode, a hole-injected carrier layer, a luminescent layer and a negative electrode and optionally an electron-injected carrier layer formed between the luminescent layer and the negative electrode, wherein the hole-injected carrier layer comprising a bis-enamine compound represented by the following formula (I):

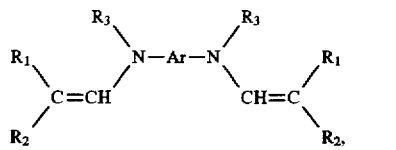

(I)

wherein $R_1$ and $R_2$ are, the same or different, a lower alkyl group or an optionally substituted aryl or heterocyclic group, or alternatively, $R_1$ and $R_2$ together with the carbon atom to which they are bonded may form a benzocycloalkyl group, the benzene ring being optionally substituted by a substituent or substituents selected from the group consisting of a halogen atom, a lower alkyl group and a lower alkoxy group; $R_3$ is an optionally substituted aryl or heterocyclic group; and Ar is a methylene group, a vinylene group or an optionally substituted $C_{6-20}$ arylene or heterocyclediyl group.

DETAILED DESCRIPTION OF THE PREFERRED EMBODIMENTS

Figure 1:
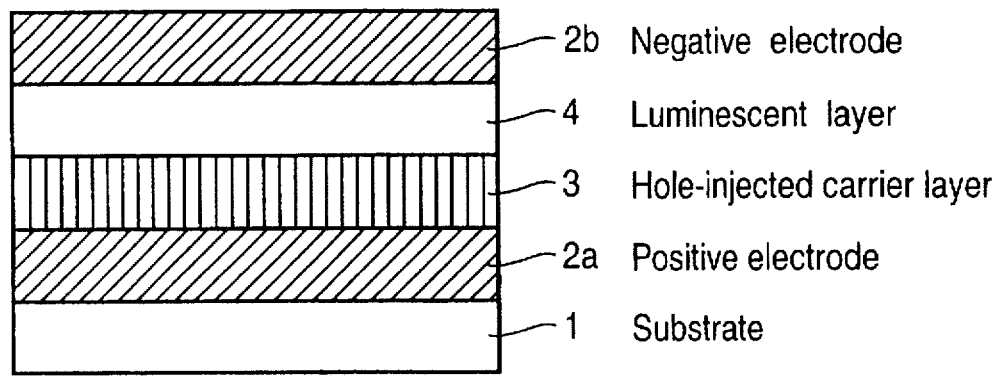
FIG. 1 is a schematic sectional view of a principal part showing an embodiment of a four-layer organic electroluminescent element in accordance with the present invention.

In order to obtain a highly reliable organic electroluminescent element having a long life, materials that do not suffer from crystallization which causes short life have been searched for in the present invention.

In other words, the present inventors have examined various materials and searched for a hole-injected carrier material which can replace TPD and which does not become crystallized or decomposed by heat easily. We found that the bis-enamine compound of the formula (I) shows a high melting point and a high glass transition point and when used it as a hole-injected carrier material gives an organic electroluminescent element having a long life and capable of providing high brightness, thus leading to the present invention. In addition, it has been found that using a specific oxazole compound of the formula (III) as mentioned below in a luminescent layer can suppress the exciplex phenomenon (formation of complex in an excited state: a phenomenon that the light emitted from the luminescent layer is shifted to a longer or shorter wavelength, inhibiting emission of light having an original color of the luminescent substance) and provides an organic electroluminescent element emitting a pure blue light, thus leading to the present invention.

In the organic electroluminescent element according to the present invention, the positive electrode, the hole-injected carrier layer, the luminescent layer and the negative electrode are preferably formed in this order on the substrate. The electron-injected carrier layer may be optionally formed between the luminescent layer and the negative electrode.

The substrate to be used is not specifically limited, so that a variety of materials such as a glass, a ceramic, a rigid plastic or the like may be used, in which a transparent substrate is preferable.

Examples of electrode materials for the positive and negative electrodes include a metal such as gold, silver, copper, aluminum, indium and magnesium, and an alloy thereof and a metal oxide such as ITO (Indium Tin Oxide) and SnO2, in which materials for forming a transparent electrode are preferable. The thickness of the positive and negative electrodes depends on the kind of the materials, but it may be such that each of the positive and negative electrodes is conductive and does not inhibit emission of light and may preferably be in the range from about 10 to about 100 nm.

Examples of the "lower alkyl group" in $R_1$ and $R_2$ of the bis-enamine compound represented by the formula (I) include straight-chain or branched-chain $C_{1-5}$ alkyl groups such as methyl, ethyl, propyl, isopropyl, butyl, t-butyl and pentyl, among which methyl, ethyl, propyl or isopropyl is preferable. Examples of the "aryl group" include phenyl, naphthyl, 2-anthryl, 2-indenyl and 1-acenaphthenyl. Examples of the "optionally substituted aryl group" include m-methylphenyl, p-methylphenyl, p-methoxyphenyl, p-ethoxyphenyl, m-chlorophenyl and 3,4-dimethoxyphenyl. Examples of the "heterocyclic group" include aromatic cyclic compounds having at least one hetero atom and condensed heterocyclic compounds condensed with a benzene ring or with each other; specifically furyl, pyridinyl, benzofuryl, indolyl, pyrimidinyl, benzothiazolyl, benzooxazolyl and carbazolyl. Examples of the "optionally substituted heterocyclic group" include N-phenylindolyl and N-ethylcarbazolyl.

Examples of the "optionally substituted aryl or heterocyclic group" for $R_3$ are the same as defined in the above.

Examples of the "$C_{6-20}$ arylene group" for Ar include m-phenylene, p-phenylene, biphenylene, triphenylene, 1,4-naphthylene, 2,7-phenanthrene, 9,10-anthrylene, 4,4"-triphenylene, 3,3'-dichlorobiphenylene and 3,3'dimethylbiphenylene. The "$C_{6-20}$ arylene group" may be optionally substituted by one or more substituents, wherein the bonding position may be either para or meta. The "substituent" referred to in the above may be a lower alkyl group such as methyl, ethyl and propyl. Examples of the "heterocyclediyl group" for Ar are the same as defined in the above, specifically 2,4-thiophenylene and 2,2'-difuran-5,5'-diyl.

Here, $R_1$ and $R_2$ in the bis-enamine compound represented by the formula (I) may form a benzocycloalkyl group together with the carbon atom to which they are bonded, the benzene ring being optionally substituted by a halogen atom, a lower alkyl group or a lower alkoxy group.

Accordingly, in one aspect, the present invention provides an organic electroluminescent element having a four-layer or five-layer structure on a substrate, comprising a positive electrode, a hole-injected carrier layer, a luminescent layer, a negative electrode and optional by an electron-injected carrier layer stacked between the luminescent layer and the negative electrode, in which the hole-injected carrier layer comprises a bis-enamine compound represented by the following formula (I')

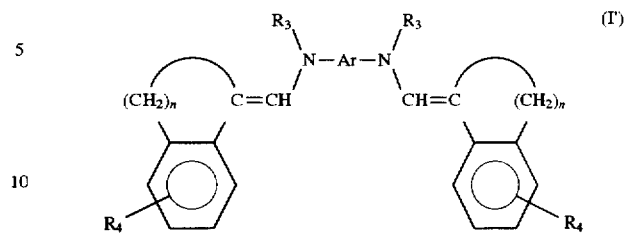

wherein $R_3$ and Ar have the same meaning as defined in the formula (I); $R_4$ is a hydrogen or halogen atom, a lower alkyl group or a lower alkoxy group; and n is an integer of 2or 3.

Examples of substituent for $R_3$ in the formula (I') are the same as defined in the formula (I). Preferably, $R_3$ is phenyl, naphthyl, m-methylphenyl, p-methylphenyl, p-methoxyphenyl, m-chlorophenyl or N-ethylcarbazolyl, among which phenyl and p-methylphenyl are more preferable.

Examples of the "lower alkyl group" for $R_4$ are the same as defined for $R_1$ and $R_2$ and examples of the "lower alkoxy group" for $R_4$ include $C_{1-4}$ straight-chain or branched-chain alkoxy groups such as methoxy, ethoxy, n-propoxy, isopropoxy, n-butoxy and t-butoxy group, among which methoxy and ethoxy are preferable. Preferably, $R_4$ is hydrogen atom, chlorine atom and methyl group, among which hydrogen atom is more preferable.

Ar in the formula (I') is the same as defined in the formula (I). Preferably, Ar is methylene, vinylene, p-phenylene, biphenylene, triphenylene, 2,5-dimethylphenylene, 3,3'-dimethylbiphenylene, 3,3'-dichlorobiphenylene, 1,1',4,4'-tetrachlorobiphenylene, 2,4-thiophenylene, 2,2'difuran-5,5'-diyl or 2,7-fluorenylene, among which p-phenylene, biphenylene and triphenylene are more preferable.

The number n is an integer of 2 or 3, preferably 3. The compounds (I) are preferred to be the compounds (I'). Specific examples of the compounds (I') are shown as follows.

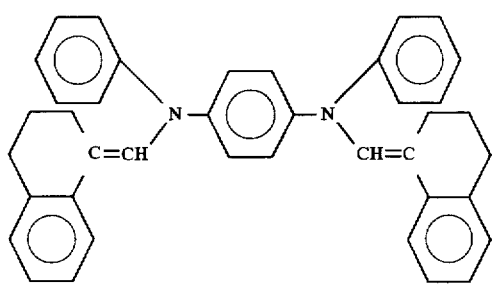

1-13

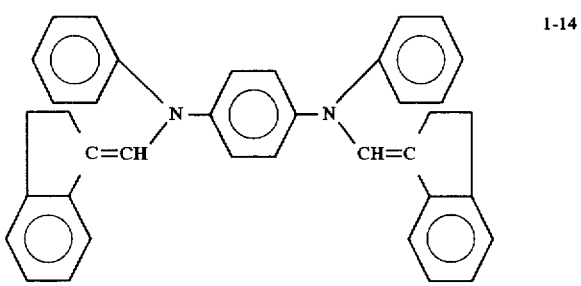

1-14

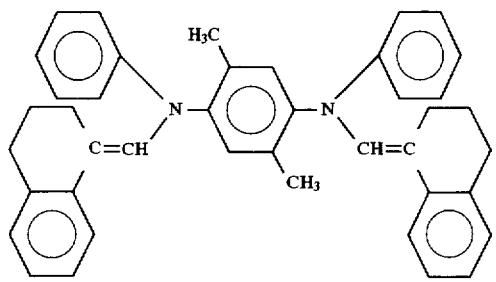

1-15

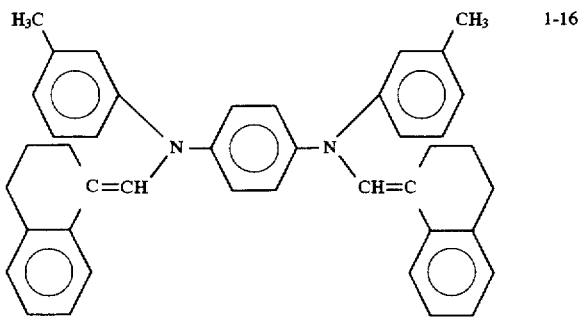

1-16

1-17
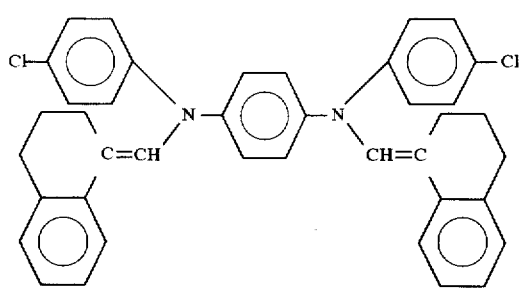
1-18
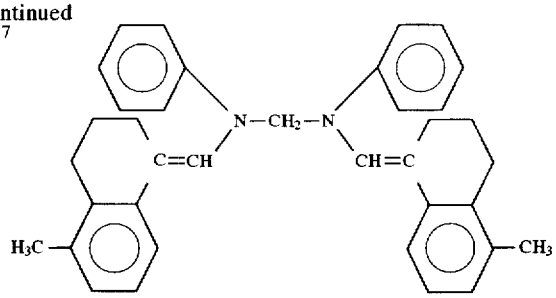
1-19
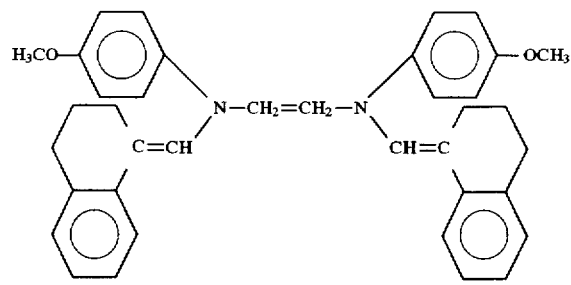
1-20
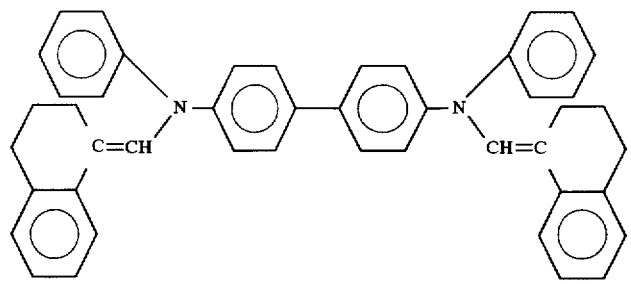
1-21
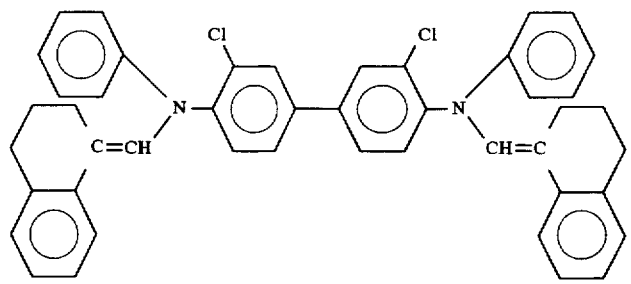
1-22
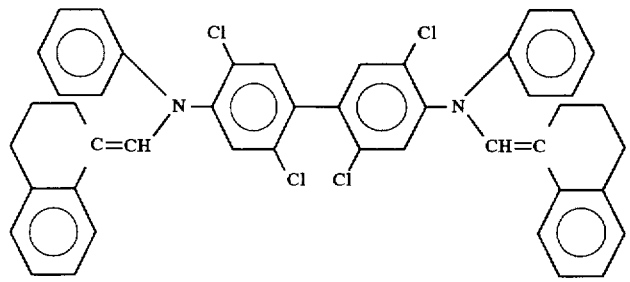
1-23
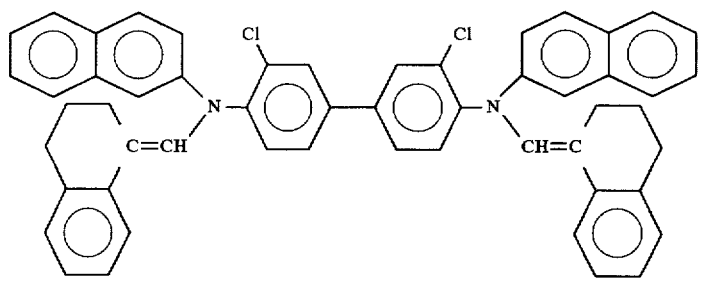

1-24
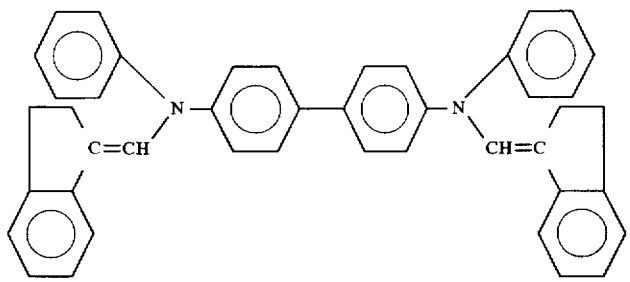
1-25
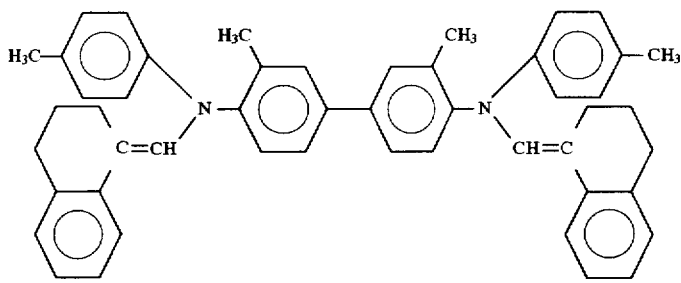
1-26
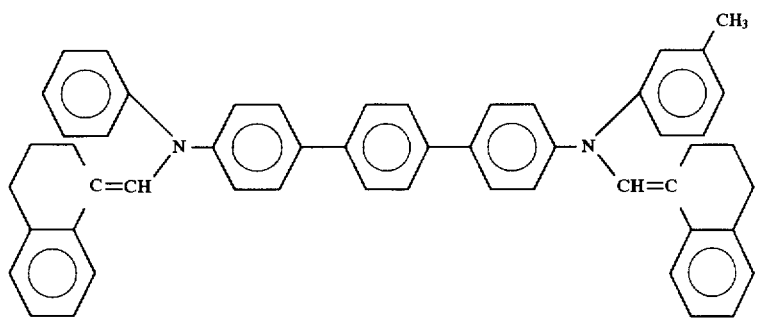
1-27
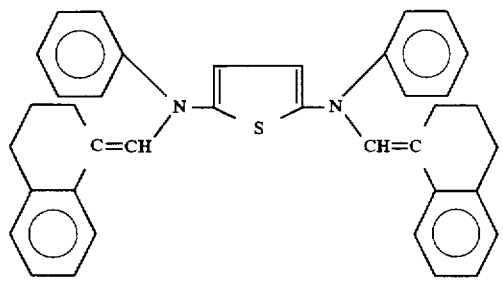
1-28
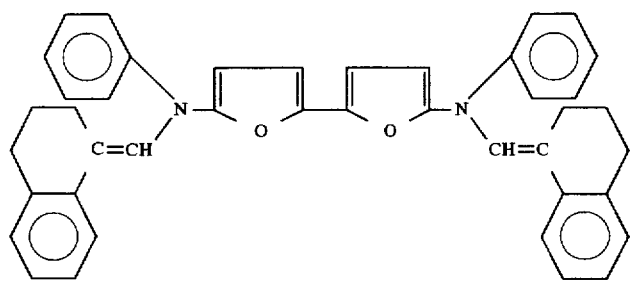

-continued

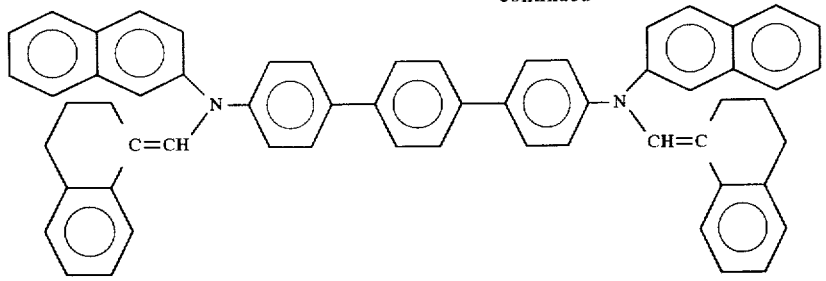
1-29

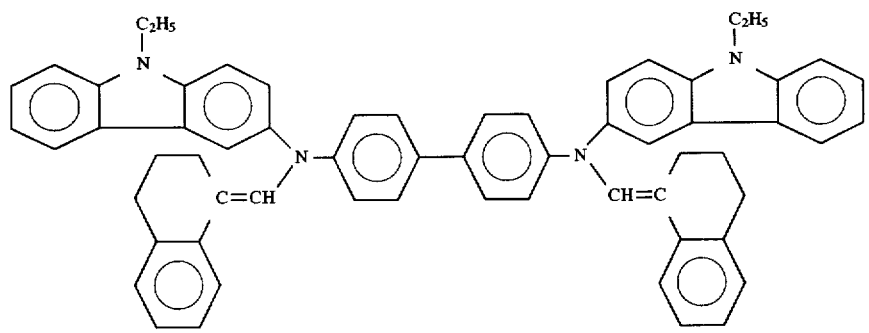
1-30

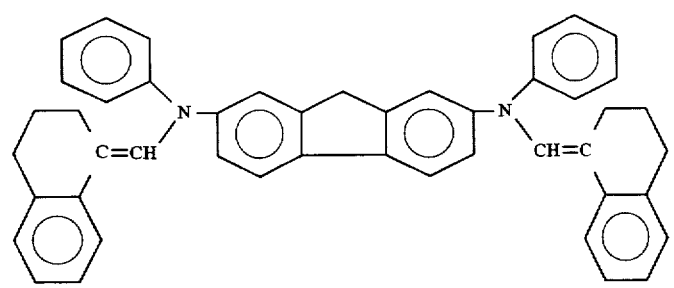
1-31

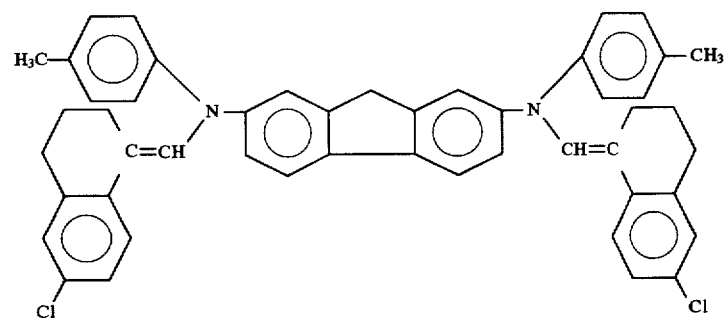
1-32

Among the above-mentioned compounds, the compounds 1-13, 1-15, 1-16, 1-20, 1-21, 1-22 and 1-26 are preferable.

Further, among the compounds of the formula (I) of the present invention, preferable ones are represented by the following formula (II):

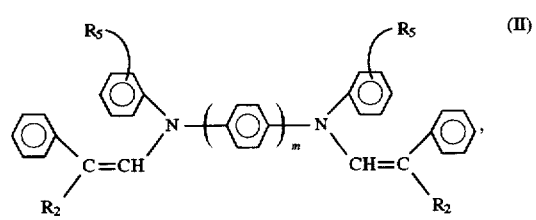
(II)

wherein $R_2$ has the same meaning as defined in the formula (I); $R_5$ is a hydrogen atom, a lower alkyl group, a lower alkoxy group or a tertiary amino group; m is an integer from 1 to 3.

Examples of the substituent for $R_2$ in the formula (II) are the same as defined in the formula (I). Preferably, $R_2$ is methyl, phenyl, p-methylphenyl, p-methoxy phenyl or furyl, among which phenyl is more preferable.

Examples of the "lower alkyl group" for $R_5$ are the same as defined for the above $R_1$ and $R_2$. Examples of the "lower alkoxy group" for $R_5$ are the same as defined for the above $R_4$. The "tertiary amino group" for $R_5$ may be a di(lower alkyl)amino group. Preferably, $R_5$ is hydrogen atom or methyl group.

Specifically, among the compounds (II), the following bis-enamine compounds are preferable.

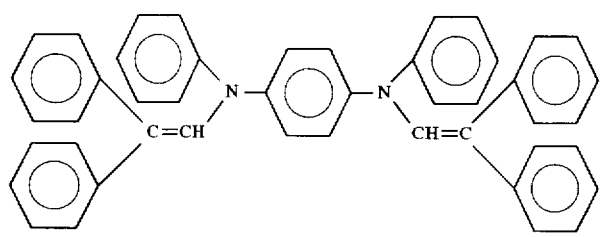
1-1
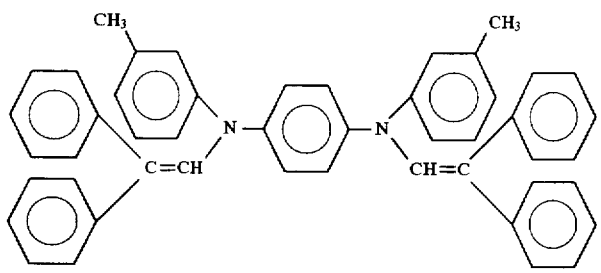
1-2
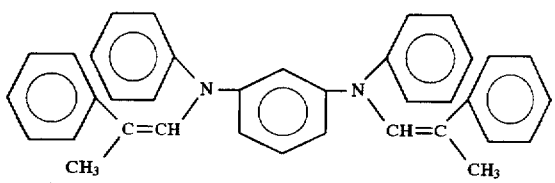
1-3
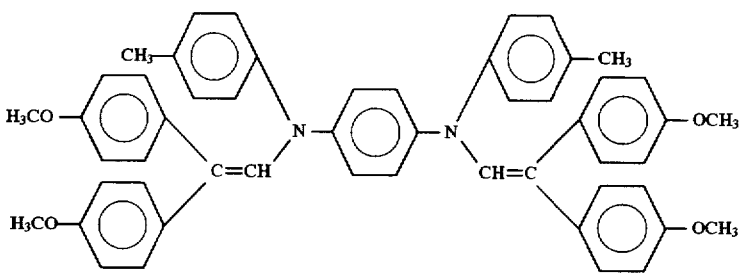
1-4
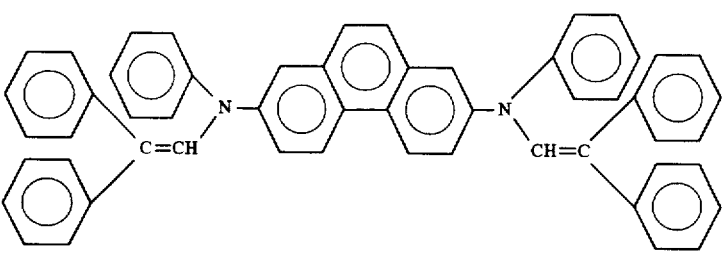
1-5
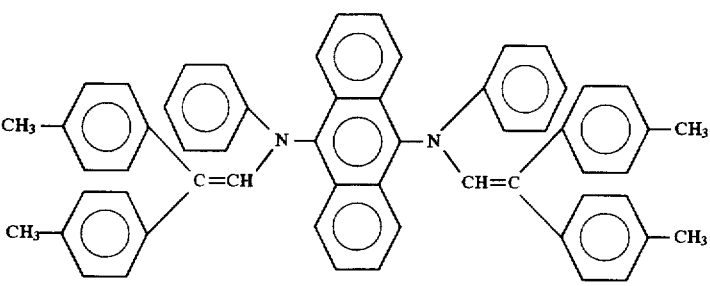
1-6

-continued

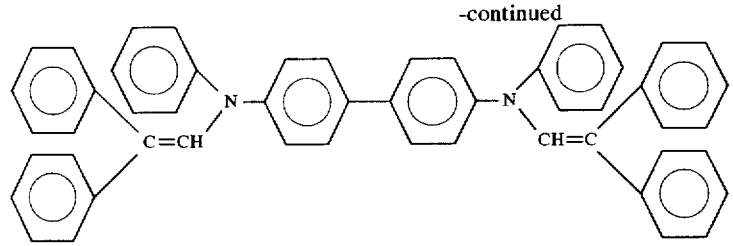

1-7

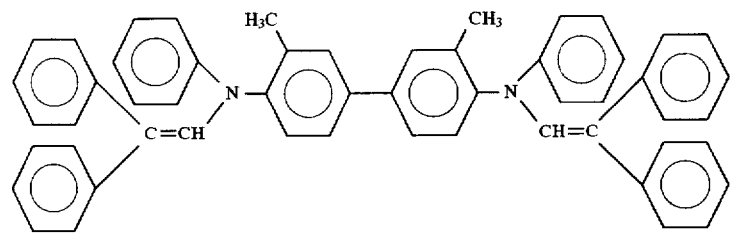

1-8

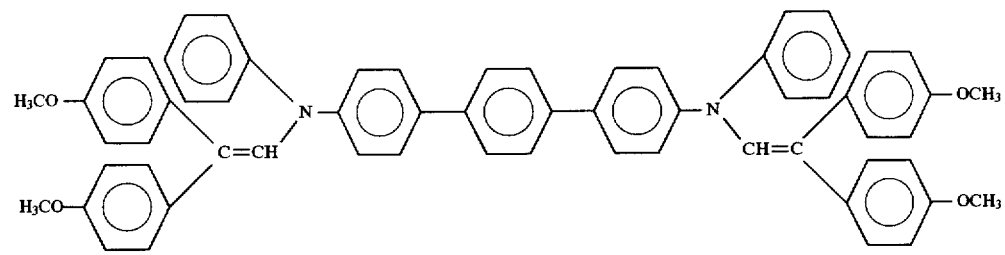

1-9

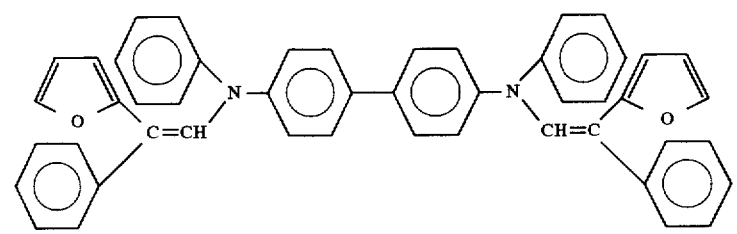

1-10

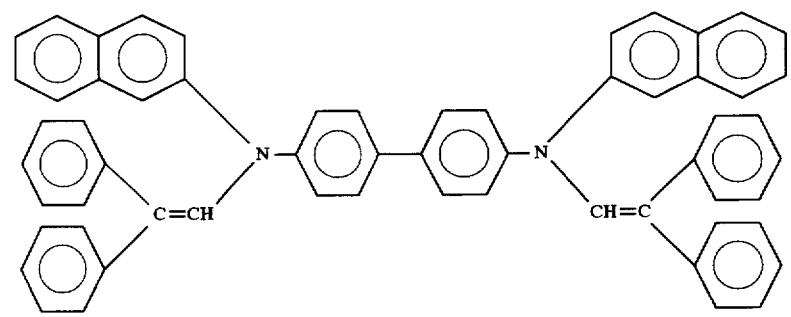

1-11

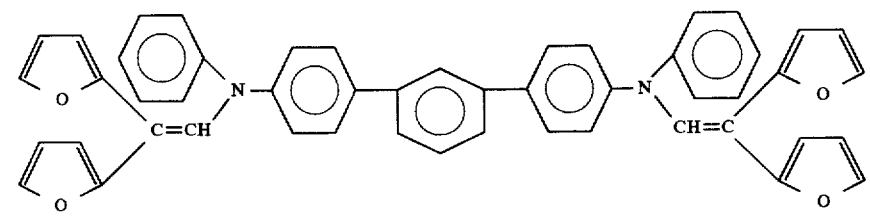

1-12

Especially, the compounds 1-1, 1-2, 1-7, 1-10 and 1-11, which are included in the compounds represented by the formula (II), are more preferable.

The hole-injected carrier layer according to the present invention may be formed in a layer structure comprising one or more layers. In this case, it is preferable that a layer containing the compound (I) is stacked on an upper or lower layer of a stacked layer structure comprising one or more layers that do not contain the bis-enamine compound (I). When the hole-injected carrier layer is formed of one layer containing the compound (I), the thickness thereof may be about 2 to about 300 nm, preferably about 5 to about 50 nm. When one or more layers that do not contain the compound (I) are stacked in addition to a layer containing the compound (I), the thickness of the layer containing the compound (I) may be about 2 to about 300 nm, preferably about 5 to about 50 nm.

The organic electroluminescent element of the present invention comprises a luminescent layer formed on the above hole-injected carrier layer. The luminescent layer may be formed of a material such as Alq3 (quinolyl aluminum complex), which is preferably doped with the bis-enamine compound (I). Particularly, when the compound doped in the luminescent layer is a bis-enamine compound (I') wherein n is 2, or is a bis-enamine compound (II) wherein m is 2, it is preferable to dope the compound at a concentration of more than 1% in the luminescent layer. This provides an organic electroluminescent element having a better luminescence efficiency.

The thickness of the luminescent layer is preferably in the range from about 10 to about 1000 nm. If the thickness is too large, the electric current flow would be bad, making it difficult to drive the element at a low voltage, hence not preferable. On the other hand, if the thickness is too small, it would be difficult to obtain a sufficient brightness, hence not preferable.

Further, the luminescent layer according to the present invention may contain an oxazole compound represented by the following formula (III):

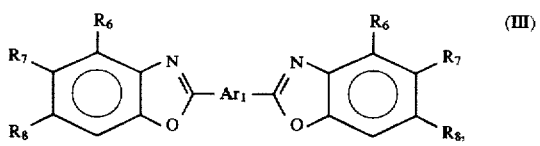
(III)

wherein $Ar_1$ is represented by the following formula:

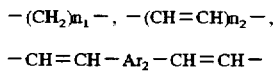

$-CH=CH-Ar_2-CH=CH-$

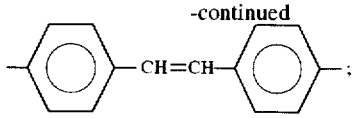
-continued $R_6$, $R_7$ and $R_8$ are, the same or different, a hydrogen atom, a halogen atom, a lower alkyl group, a lower alkoxy group or a phenyl group, or alternatively, both of $R_6$ and $R_7$ or both of $R_7$ and $R_8$ form a naphthalene ring; Ar2 is a $C_{6-20}$ arylene group; and $n_1$ and $n_2$ each are an integer of 1 to 4.

These oxazole compounds are especially effective in forming a luminescent layer of a blue-light-emitting element and can provide an organic electroluminescent element with little exciplex phenomenon. Here, it is possible to use a compound other than those represented by the formula (I), but it is preferable to use a compound represented by the formula (I).

In the oxazole compounds represented by the formula (III), examples of the "lower alkyl group" or the "lower alkoxy group" for $R_6$, $R_7$ and $R_8$ are the same as defined for the above $R_5$. $Ar_1$ may be polyethylene, polyvinylene, arylene or substituted vinylene. Examples of the "$C_{6-10}$ arylene group" for $Ar_2$ include m-phenylene, p-phenylene, biphenylene, 1,4-naphthylene and 2,7-phenanthrene. The numbers $n_1$ or $n_2$ is an integer from 1 to 4, among which 1 is preferable for each case.

When the oxazole compounds are used for the luminescent layer, characteristics similar to those mentioned above also appear depending on the thickness of the layer, so that it is preferable to have a thickness similar to the above.

Further, among the compounds represented by the formula (III), the preferable ones are those represented by the following formula (IV):

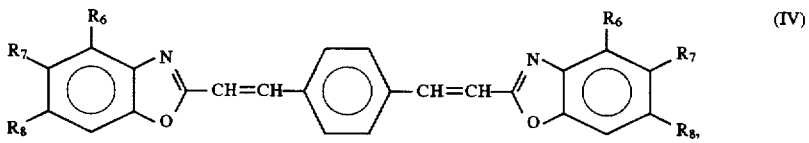
(IV)

wherein $R_6$, $R_7$ and $R_8$ have the same meaning as defined in the formula (III)

The specific examples of the oxazole compounds represented by the compounds (IV) are shown as follows.

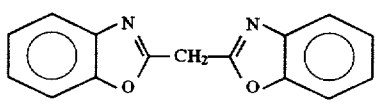
2-1

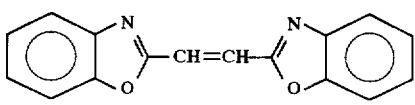
2-2

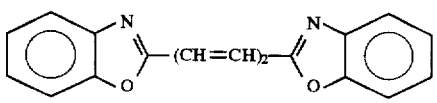
2-3

-continued 2-4
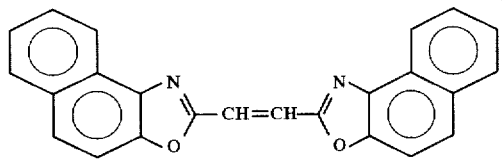

2-5
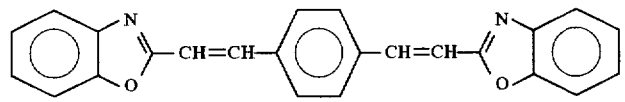

2-6
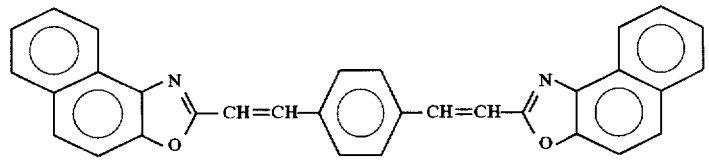

2-7
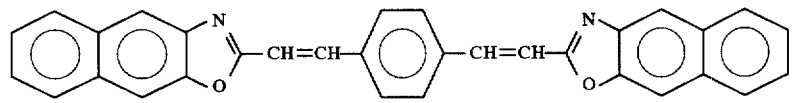

2-8
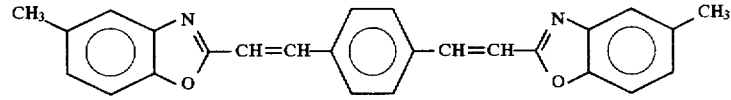

2-9
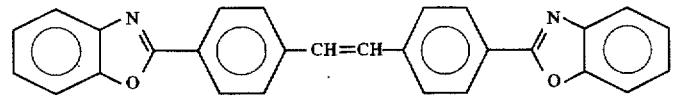

2-10
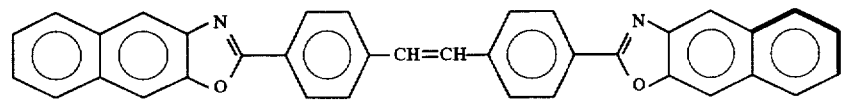

2-11
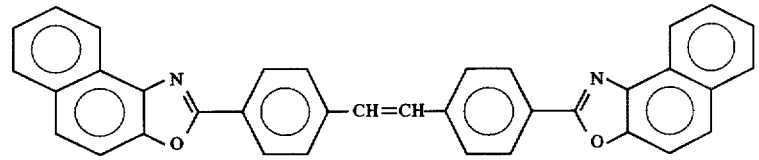

2-12
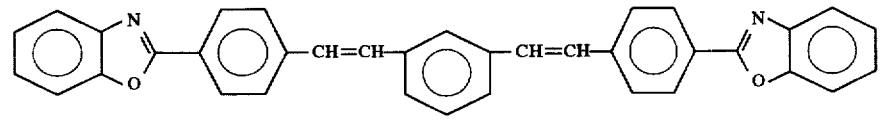

2-13
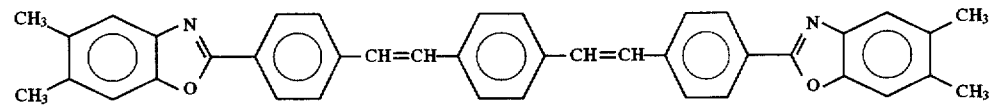

2-14
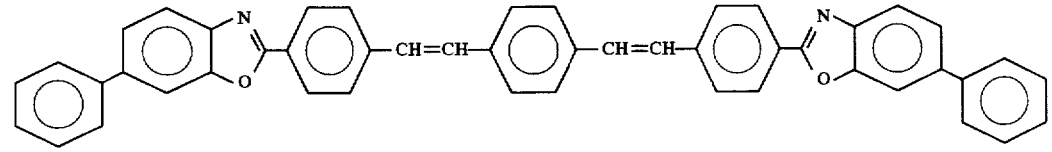

2-15
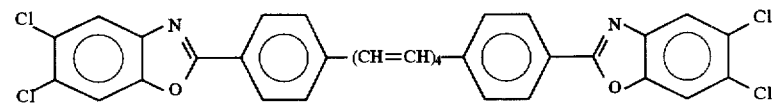

In the above-mentioned compounds, the compounds 2-5, 2-6, 2-7, 2-8, 2-13 and 2-14 are more preferable.

The organic electroluminescent element according to the present invention may further comprise an electron-injected carrier layer stacked on the luminescent layer (between the luminescent layer and the after-mentioned negative electrode). This promotes injection and mobilization of electrons into the luminescent layer.

The material to be used for forming the electron-injected carrier layer is preferably a compound which has a high glass transition point and which does not easily crystallize. The material may be a compound that can be used as an electron-transporting compound in a electrophotographic photoconductor material, examples thereof including a trinitrofluorenone, a 1-cyano-1-phenyl-2-(p-trifluoromethylphenyl)ethylene (having the following structural formula) and a quinacridone.

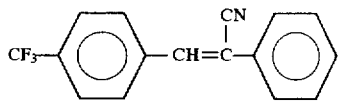

The electron-injected carrier layer is formed on the luminescent layer by vapor deposition. The thickness of the electron-injected carrier layer stacked on the luminescent layer by vapor deposition is about 10 to about 1000 nm, preferably about 20 to about 200 nm.

Generally, the organic electroluminescent element according to the present invention is formed into a structure on a substrate comprising, a positive electrode stacked on the substrate, a hole-injected carrier layer stacked on the positive electrode, a luminescent layer stacked on the hole-injected carrier layer and a negative electrode stacked thereon with an optional electron-injected carrier layer lying between the luminescent layer and the negative electrode. These layers may be formed by a conventional filmforming method such as a vacuum deposition method, a spincoating method, a casting method and a dip-coating method.

The bis-enamine compound represented by the formula (I') according to the present invention can be synthesized by appropriate methods including methods known per se, for example, by the following synthesis process.

Namely, the bis-enamine compound (I') according to the present invention may be obtained by heating for dehydrative condensation of various N,N'-di-substituted amine compounds represented by the following formula (V) and two equivalents of various aldehyde derivatives represented by the following formula (VI) in a solvent such as benzene.

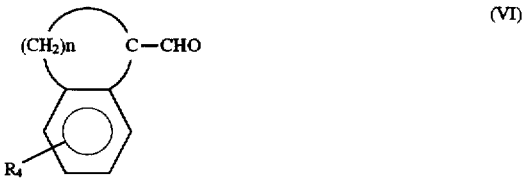

wherein $R_3$, $R_4$, Ar and n have the same meaning as defined in the formula (I').

Since the hole-injected carrier layer of the organic electroluminescent element according to the present invention comprises a specific organic compound which has a high glass transition point and which does not easily crystallize, it is possible to obtain an organic electro-luminescent element having a long life.

Further, it is possible to obtain a pure blue-light-emitting element by using a specific oxazole compound as a luminescent material for forming a luminescent layer.

EXAMPLES

The present invention will hereinafter be detailed in conjunction with the following examples, which are not to be construed as being intended to limit the scope of the present invention.

Synthesis

The N,N'-di-substituted amine compounds represented by the following formula (VII) and two equivalents of the aldehyde derivatives represented by the following formula (VIII) were heated for dehydrative condensation with a DL-10-camphorsulfonic acid catalyst in toluene to obtain a compound 1-16. Recrystallization was performed in ethyl acetate.

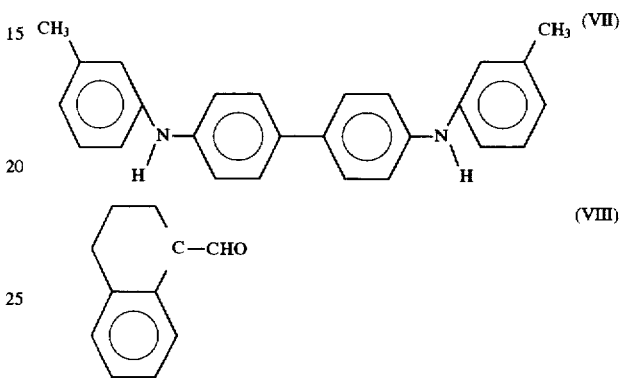

EXAMPLES 1–6 AND COMPARISON 1

An ITO film which is a transparent electrode was formed to a thickness of 150 nm as a positive electrode 2a on a transparent glass substrate 1 having a thickness of 1 mm, as shown in FIG. 1. Further, a bis-enamine compound shown in table 1 was formed thereon to a thickness of 75 nm as a hole-injected carrier layer 3 by vacuum vapor deposition. Next, Alq3 was formed to a thickness of 60 nm as a luminescent layer 4 on the hole-injected carrier layer 3 by vacuum vapor deposition. Then, Mg:Ag was codeposited as a negative electrode 2b by vacuum vapor deposition.

Here, an element in which a hole-injected carrier layer comprises TPD disclosed in Japanese Unexamined Patent Publication No. Sho 59(1984)-194393 was prepared as a compar

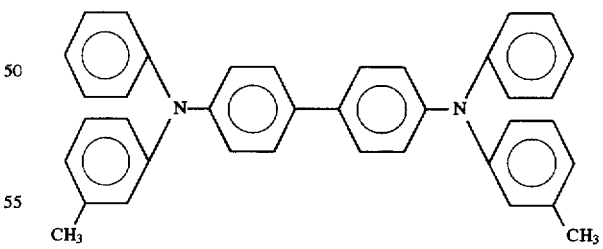

The electric current and the maximum brightness were measured when a voltage of 15 V was applied between the positive electrode 2a and the negative electrode 2b of each of the thus prepared organic electroluminescent elements. Also, the life (half life) of each of the elements was determined by measuring a period of time in which the brightness decreased from 200 cd/m$^2$ to 100 cd/m$^2$. The measurement was performed in Argon gas at a room temperature (20° C.).

TABLE 1

| Organic electroluminescent element | Bis-enamine compound | Electric current (mA/cm²) | Maximum brightness (cd/m²) | Life (half life) (hours) |
|---|---|---|---|---|
| Example 1 | Compound 1–2 | 12 | 3800 | 280 |
| Example 2 | Compound 1–7 | 18 | 4900 | 680 |
| Example 3 | Compound 1–11 | 32 | 5500 | 695 |
| Example 4 | Compound 1–16 | 15 | 4200 | 430 |
| Example 5 | Compound 1–20 | 20 | 6600 | 705 |
| Example 6 | Compound 1–26 | 18 | 6400 | 680 |
| Comparison 1 | — | 9 | 2300 | 190 |

Table 1 shows that the bis-enamine compounds of the present invention are superior to TPD in both the maximum brightness and the life when used in a hole-injected carrier layer of a luminescent element and, especially, the compounds of 1-7, 1-11, 1-20 and 1-26 have an efficiency of two times to four times that of the TPD.

This seems to be partly due to the high hole transportation efficiency and the high glass transition point of the bis-enamine compound of the present invention.

For example, the hole transportation efficiency and the glass transition point of the compound 1-7 or 1-20 and TPD were compared as shown in Table 2.

TABLE 2

| Hole-injected carrier compound | Hole transportation efficiency (cm²/VS) | Glass transition point (°C.) |
|---|---|---|
| Compound 1–7 | $1.2 \times 10^{-4}$ | 89.4 |
| Compound 1–20 | $1.5 \times 10^{-4}$ | 87.7 |
| TPD | $8.1 \times 10^{-6}$ | 64.6 |

EXAMPLES 7–14

Among oxazole compounds, compounds 2-6, 2-10, 2-8 and 2-13 were used as a luminescent material for forming a luminescent layer 4 and, among bis-enamine compounds, compounds 1-7, 1-9, 1-20 and 1-25 were used as a material for forming a hole-injected carrier layer 3 so as to prepare eight kinds of organic electroluminescent element in the same manner as in the above examples 1 to 6.

A voltage of 15 V was applied to each of the thus prepared organic electroluminescent elements to measure the maximum brightness and the life (half life) represented by the period of time in which the brightness decreased from 200 cd/m² to 100 cd/m². Also, the maximum brightness wavelength was measured. The results are shown in Table 3.

TABLE 3

| Organic electroluminescent element | Bis-enamine compound | Oxazole compound | Maximum brightness (cd/m²) | Life (hours) | Peak wavelength (nm) |
|---|---|---|---|---|---|
| Example 7 | Compound 1–7 | Compound 2–6 | 3300 | 590 | 475 |
| Example 8 | Compound 1–7 | Compound 2–10 | 3200 | 585 | 470 |
| Example 9 | Compound 1–9 | Compound 2–6 | 2200 | 480 | 465 |
| Example 10 | Compound 1–9 | Compound 2–10 | 2100 | 430 | 465 |
| Example 11 | Compound 1–20 | Compound 2–8 | 4500 | 555 | 470 |
| Example 12 | Compound 1–20 | Compound 2–13 | 4700 | 540 | 475 |
| Example 13 | Compound 1–25 | Compound 2–8 | 5100 | 290 | 460 |
| Example 14 | Compound 1–25 | Compound 1–13 | 5300 | 310 | 460 |

EXAMPLE 15

An organic electroluminescent element was prepared in the same manner as in the example 2 except that a luminescent layer was formed in a mixture of 1 part of compound 1-7 added to 10 parts of Alq3 by vacuum vapor deposition method as a luminescent layer 4 in the luminescent element of the example 2. The maximum brightness and the life of the element were measured in the same manner as in the example 2. The maximum brightness was 4900 cd/m², which meant a very small change. However, the life was 770 (H), which meant 10% increase. This seems to be due to the fact that the crystallization of Alq3 was prevented by the addition of the bis-enamine compound and that the bis-enamine compound itself has a very high luminescent property.

EXAMPLE 16

Figure 2:
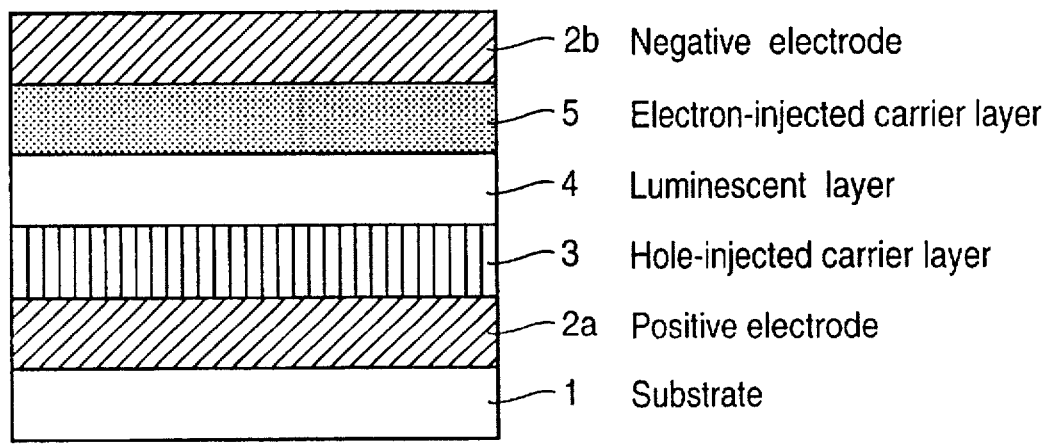
FIG. 2 is a schematic sectional view of a principal part showing an embodiment of a five-layer organic electroluminescent element in accordance with the present invention.

An organic electroluminescent element was prepared in the same manner as in the example 5 except that an electron injected carrier layer of Alq3 to which a bisstilbene compound represented by the following structural formula was added by 0.7% was formed to a thickness of 40 nm by vacuum vapor deposition method between the negative electrode 2b and the luminescent layer 4, as shown in FIG. 2.

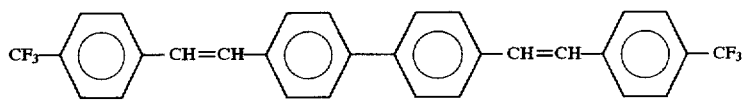

The maximum brightness and the life of this element were measured in the same manner as in the example 5. The maximum brightness was 7400 cd/m² and the life was 1450 hours, which showed improvement of properties in the brightness and the life. Especially, the prolongation of the life was outstanding and it took more than 50,000 hours until the light was completely extinguished.

As a guide for the search of the present invention, it seemed that materials having a high melting point or a high glass transition point (a temperature at which an amorphous substance becomes crystallized, as measured by differential scanning calorimetry (DSC) or the like) are suitable. This is based on a report in the 39th Joint Lecture Meeting related to Applied Physics 28p-Q-9. The report recites that a substance having a high melting point is suitable for preventing meltage caused by generation of heat through luminescence of the element and that TPD becomes deteriorated by crystallization because the temperature of the element goes beyond the glass transition point of TPD.

Since the hole-injected carrier layer comprises a specific organic compound which has a high glass transition point and which does not easily crystallize, the present invention provides a four-layer or five-layer organic electroluminescent element having a high brightness and a long life.

Further, by using a specific oxazole compound as a luminescent material for forming a luminescent layer, it is possible to obtain a blue-light-emitting organic electroluminescent element having a high brightness and a long life. Accordingly, the organic electroluminescent element of the present invention is applicable as a light source, a display or the like that needs a long term reliability and hence has a high industrial value.

What we claim is:

1. An organic electroluminescent element comprising a substrate are stacked layers thereon of, a positive electrode, a hole-injected carrier layer, a luminescent layer and a negative electrode and optionally an electron-injected carrier layer formed between the luminescent layer and the negative electrode, wherein the hole-injected carrier layer comprising a bis-enamine compound represented by the following formula (I):

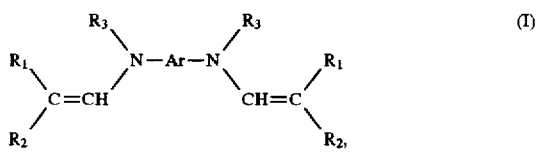

wherein $R_1$ and $R_2$ are, the same or different, a lower alkyl group or an optionally substituted aryl or heterocyclic group, or alternatively, $R_1$ and $R_2$ together with the carbon atom to which they are bonded may form a benzocycloalkyl group, the benzene ring being optionally substituted by a substituent or substituents selected from the group consisting of a halogen atom, a lower alkyl group and a lower alkoxy group; $R_3$ is an optionally substituted aryl or heterocyclic group; and Ar is an optionally substituted $C_{6-20}$ arylene or heterocyclediyl group.

2. An organic electroluminescent element as set forth in claim 1, which is in the form of a five-layer organic electroluminescent element having on a substrate stacked layers of, a positive electrode, a hole-injected carrier layer, a luminescent layer, an electron-injected carrier layer and a negative electrode, wherein the hole-injected carrier layer comprises a bis-enamine compound (I).

3. An organic electroluminescent element as set forth in claim 1, in which, when $R_1$ and $R_2$ together with the carbon atom to which they are bonded form a benzocycloalkyl group, the formula (I) is represented by the formula (I'):

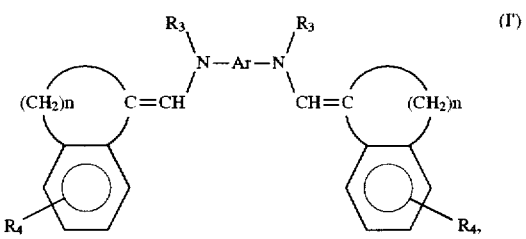

wherein $R_3$ and Ar have the same meaning as defined in the formula (I); $R_4$ is a hydrogen atom, a halogen atom, a lower alkyl group or a lower alkoxy group; and n is an integer of 2 or 3.

4. An organic electroluminescent element as set forth in claim 3, in which $R_3$ in the formula (I') is phenyl, naphthyl, m-methylphenyl, p-methylphenyl, p-methoxyphenyl, m-chlorophenyl or N-ethylcarbzolyl group; $R_4$ is hydrogen atom, chlorine atom or methyl group; Ar is methylene, vinylene, p-phenylene, biphenylene, triphenylene, 2,5-dimethylphenylene, 3,3'-dimethylbiphenylene, 3,3'-dichlorobiphenylene, 1,1',4,4'-tetrachlorobiphenylene, 2,4-thiophenylene, 2,2'-difuran-5,5'-diyl or 2,7'-fluorenylene.

5. An organic electroluminescent element as set forth in claim 3, in which $R_3$ in the formula (I') is phenyl or p-methylphenyl group.

6. An organic electroluminescent element as set forth in claim 3, in which $R_4$ in the formula (I') is hydrogen atom.

7. An organic electroluminescent element as set forth in claim 3, in which Ar in the formula (I') is p-phenylene, biphenylene or triphenylene.

8. An organic electroluminescent element as set forth in claim 3, in which n in the formula (I') is 3.

9. An organic electroluminescent element as set forth in claim 1, in which the compound of the formula (I) is a bis-enamine compound represented by the formula (II):

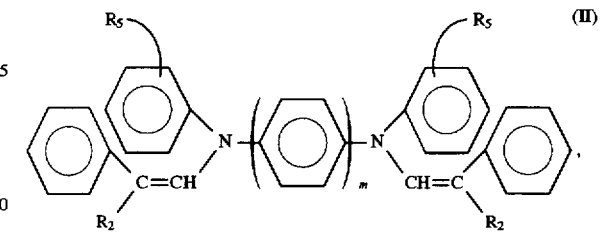

wherein $R_2$ has the same meaning as defined in the formula (I); $R_5$ is a hydrogen atom, a lower alkyl group, a lower alkoxy group or a tertiary amino group; and m is an integer of 1 to 3.

10. An organic electroluminescent element as set forth in claim 9, in which $R_2$ in the formula (II) is methyl, phenyl, pmethylphenyl, p-methoxyphenyl or furyl; $R_5$ is hydrogen atom or methyl group; and m is 1 or 2.

11. An organic electroluminescent element as set forth in claim 9, in which $R_2$ in the formula (II) is phenyl group.

12. An organic electroluminescent element as set forth in claim 1, in which the compound of the formula (I) is:

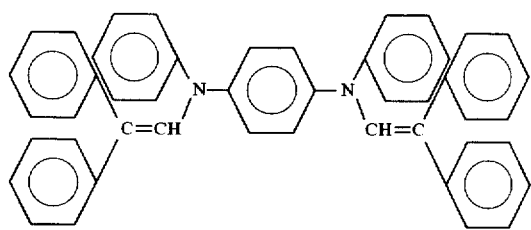
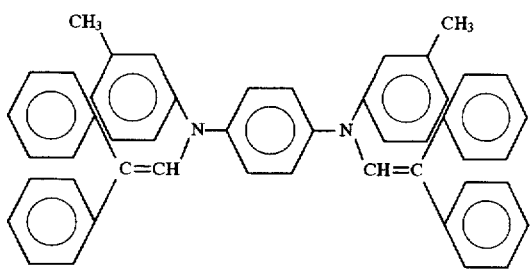
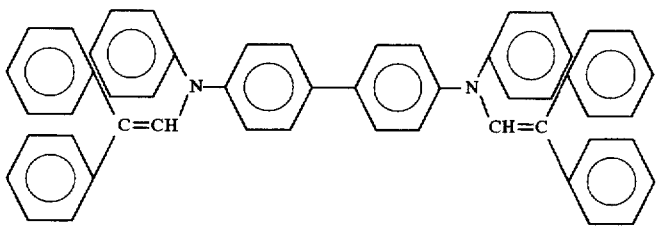
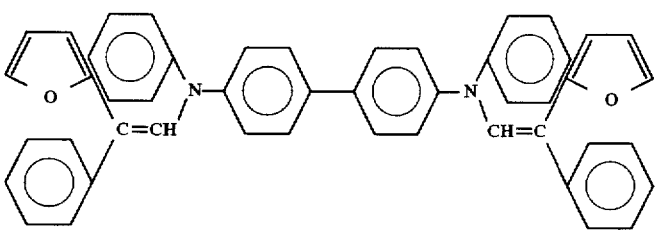
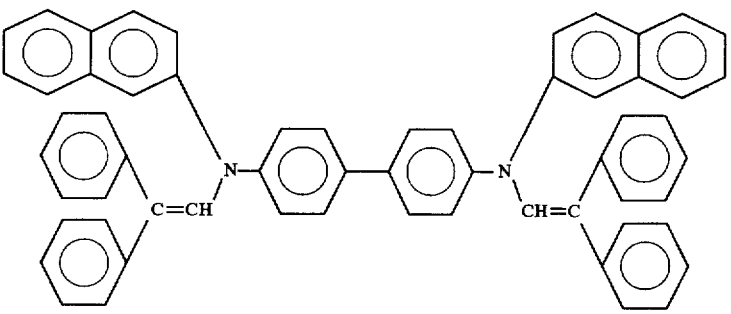
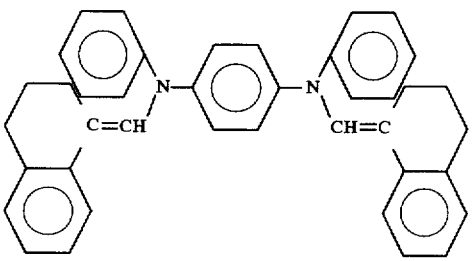

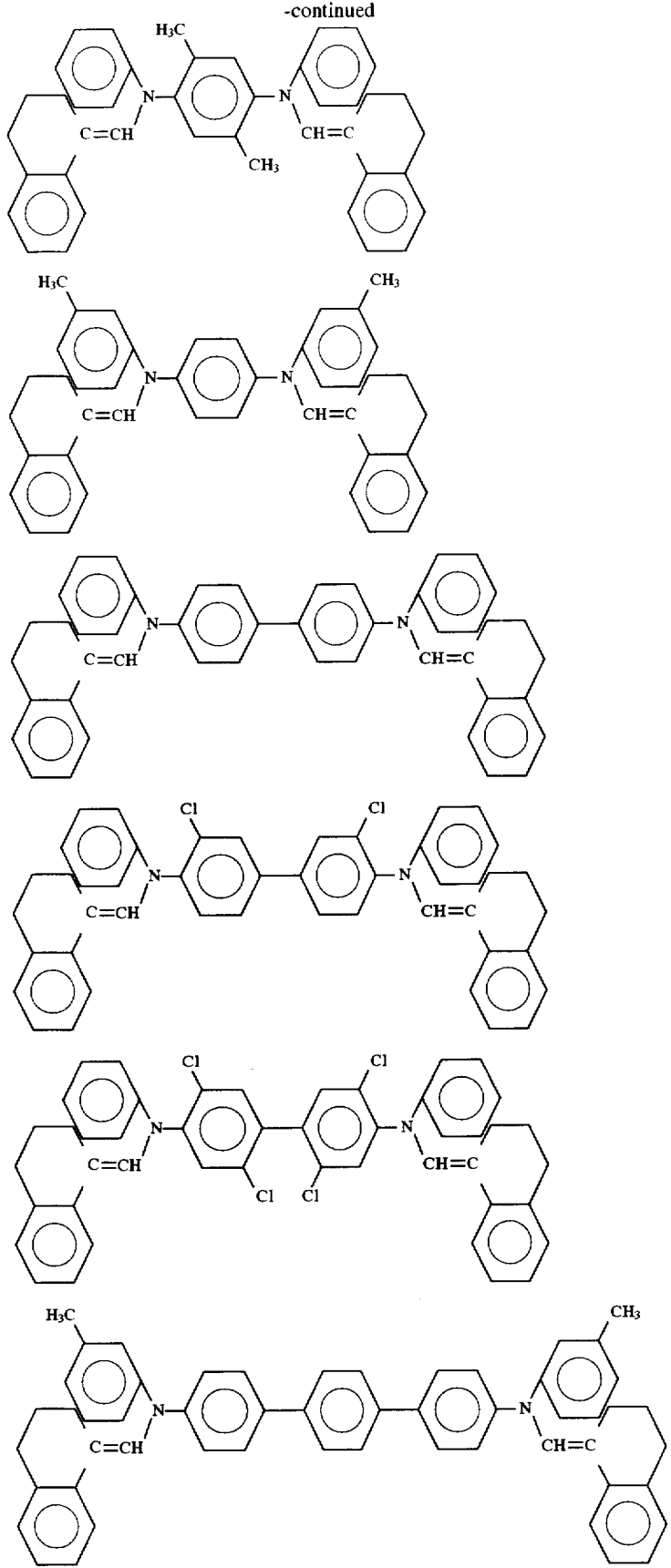

13. An organic electroluminescent element as set forth in claim 1, in which the luminescent layer contains a compound of the formula (I).

14. An organic electroluminescent element as set forth in claim 1, in which the luminescent layer contains an oxazole compound of the formula (III):

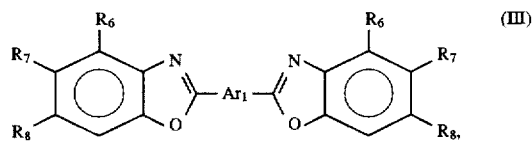

wherein $Ar_1$ is represented by the following formula:

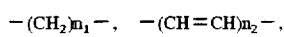

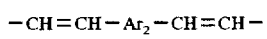

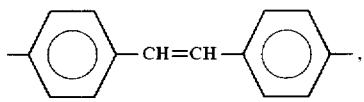

$R_6$, $R_7$ and $R_8$ are, the same or different, a hydrogen atom, a halogen atom, a lower alkyl group, a lower alkoxy group or a phenyl group, or alternatively, both of $R_6$ and $R_7$ or both of $R_7$ and $R_8$ form a naphthalene ring; $Ar_2$ is a $C_{6-20}$ arylene group; and $n_1$ and $n_2$ each are an integer of 1 to 4.

15. An organic electroluminescent element as set forth in claim 14, in which the compound of the formula (III) is an oxazole compound represented by the formula (IV):

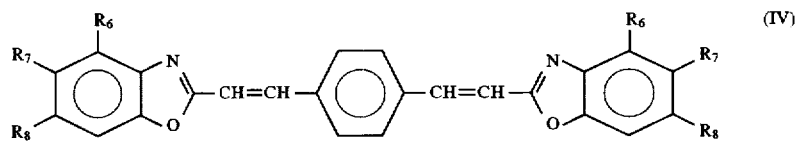

wherein $R_6$, $R_7$ and $R_8$ have the same meaning as defined in the formula (III).

16. An organic electroluminescent element as set forth in claim 14, in which the compound of the formula (IV) is:

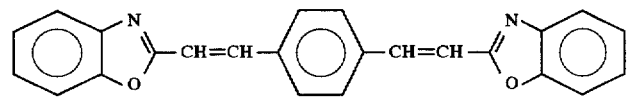

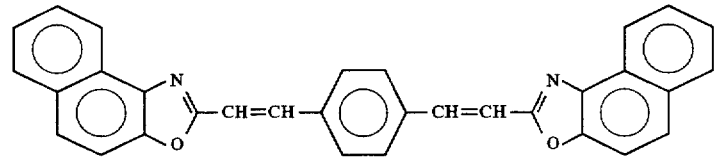

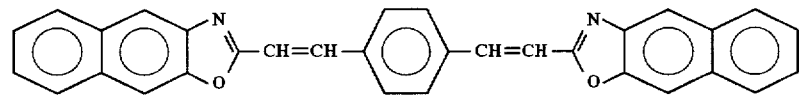

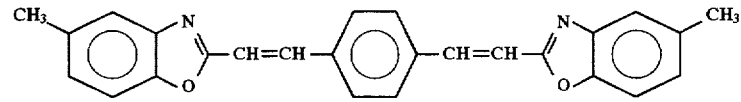

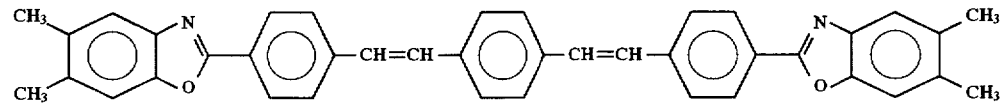

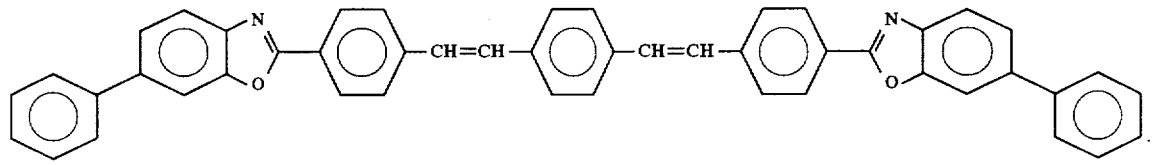

* * * * *